United States Patent [19]

Bethurum et al.

[11] Patent Number: 5,080,576

[45] Date of Patent: Jan. 14, 1992

[54] APPARATUS FOR FORMING AN INTERNAL GROOVE IN A MOLDED PART

[75] Inventors: Gary Bethurum, Laguna Niguel; Randy Anderson, Brea, both of Calif.

[73] Assignee: Thomas & Betts Corporation, Bridgewater, N.J.

[21] Appl. No.: 634,667

[22] Filed: Dec. 27, 1990

[51] Int. Cl.⁵ ............................................. B29C 45/44
[52] U.S. Cl. ................................... 425/577; 249/179; 249/183; 264/318; 264/328.7; 425/DIG. 58
[58] Field of Search ....................... 425/577, DIG. 58; 249/153, 179, 183; 264/318, 328.7

[56] References Cited

U.S. PATENT DOCUMENTS 4,958,676  9/1990  Kuntz ................................. 164/340

Primary Examiner—Timothy Heitbrink
Attorney, Agent, or Firm—Robert M. Rodrick; Salvatore J. Abbruzzese

[57] ABSTRACT

A die apparatus permits the formation of an internal recess in a molded part. The die apparatus includes first and second mold members which are movable between an open and closed position. A core pin assembly includes a first core pin element and a second core pin element supported between the movable mold members for relative movement therewith. A resiliently deformable element is positioned between the first and second core pin elements. The resiliently deformable element is deformably expandable to form an external projection upon relative movement of the mold members to a closed position, and is elastically returnable upon the relative movement of the mold members to an open position.

14 Claims, 1 Drawing Sheet

APPARATUS FOR FORMING AN INTERNAL GROOVE IN A MOLDED PART

FIELD OF THE INVENTION

The present invention relates to a die apparatus for forming an internal groove in a molded article. More particularly, the present invention relates to a core pin assembly which permits the molding of a groove internally of a molded part, while permitting the core pin assembly to be easily inserted into the mold and removed from the mold without interfering with the newly molded part.

BACKGROUND OF THE INVENTION

Plastic parts often require grooves or undercuts about an internal bore to accommodate snap fitting parts. One example is a snap-cap used to close a plastic container. The existing technique used to provide undercuts or grooves in such molded parts is to use collapsable core pins. These core pins, usually in the form of a split collet, include cam mechanisms permitting the core pin to be expanded once it is inserted between the mold halves. Plastic is injected between the mold halves and around the core pin to form the molded part. The cam mechanism is again actuated so that the split collet returns to its pre-expanded state so that the core pin can be removed from the mold.

While use of a split collet type core pin may adequately provide grooves or undercuts of relatively large diameter, it is difficult to construct a cam actuated core pin mechanism of this type for grooves or undercuts of smaller diameter. Cam actuation of smaller components is cumbersome. Also, it is difficult to form small, precise parts using this technique.

It is desirable to provide a core pin mechanism which can be easily inserted into and removed from a mold and which permits the formation of a groove or undercut of relatively small size in the molded part.

SUMMARY OF THE INVENTION

It is therefore an object of the present invention to provide a die apparatus for forming an internal groove in a molded part.

It is a further object of the present invention to provide a die apparatus which permits the formation of a small internal groove in a molded part with a core pin assembly that can be easily inserted into and removed from the mold.

It is a still further object of the invention to provide a die apparatus for placing an internal groove in a molded part which is actuated by the opening and closing of the mold.

In the efficient attainment of these and other objects, the present invention provides a die apparatus for forming an internal groove in a molded part. The die apparatus includes a pair of mold members relatively movable toward and away from one another. A first core pin member is supported by one of the mold members and a second pin member is supported by the other mold members. The first core pin member is movable with respect to the second core pin member. A resiliently deformable element is supported between the first and second core pin members. The resiliently deformable element is compressibly expandable between the first and second core pin members to expand from a first state to a second state which permits the formation of the internal groove in the molded part. The compressible element is returnable to its first state to permit removal of the first and second core pin members from the mold.

As more particularly shown by way of the preferred embodiment herein, the present invention provides a die apparatus for forming an annular groove in a molded part. The apparatus includes a first mold member and a second mold member relatively movable with respect to the first mold member, between an open and closed position. A first core pin element is supported by the first mold member and a second core pin element is supported by the second mold member. A resiliently deformable annular ring is supported between the first and second mold members. The ring is compressible therebetween upon relative movement of said first and second mold members, to a condition where the ring is expanded to permit the formation of an annular groove in the part and returns to its original position to permit removal of the core pin elements from the mold.

DETAILED DESCRIPTION OF THE PREFERRED EMBODIMENTS

Figure 1:
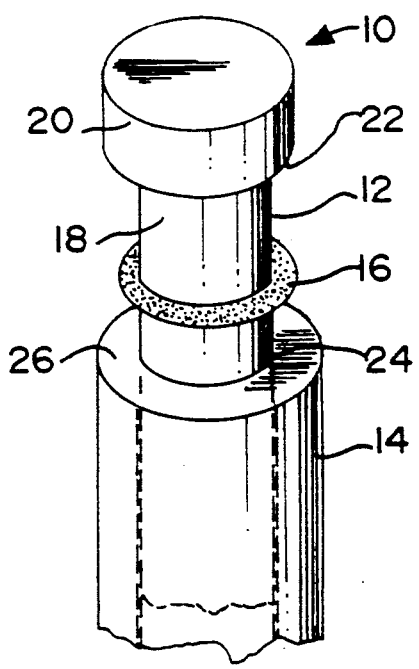
FIG. 1 shows in perspective view, the core pin assembly of the present invention.

Referring to FIG. 1, a core pin assembly 10, used in accordance with the present invention, is shown. Core pin assemblies are typically used in the plastic molding art to mold openings, recesses or bores in a molded plastic parts. The core pin is inserted between mold halves and plastic is injected therearound. The space occupied by the core pin assembly defines the recess or bore in the molded plastic part.

The present invention finds particular utility in the molding of an undercut or groove about a bore placed in a molded plastic part. As mentioned above, such undercuts may be used to permit snap attachment of complementary parts. One such use is in electrical connectors where a plastic connector housing supports electrical components. A cap may be employed to cover and protect exposed components. This is especially true in automobile connectors where the conductive components must be protected from dirt, debris and other engine contaminants.

The core pin assembly 10 of the present invention includes an upper core pin 12 and a lower core pin 14, both of which are typically formed of hardened steel. Upper and lower core pins 12 and 14 are constructed to be relatively movable with respect to each other.

An annular O-ring 16 is positioned between upper and lower core pins 12 and 14. Annular O-ring 16 is an elastomeric member which, as will be described in further detail hereinbelow, is resistant to high temperatures such as those typically encountered in molding processes.

In the particular embodiment of the present invention as shown in FIG. 1, upper core pin 12 includes a longitudinal cylindrical shaft 18. A disc-shaped plate 20 is positioned at the upper end of cylindrical shaft 18. Disc-shaped plate 20 extends radially beyond the outer diameter of cylindrical shaft 18 to form an annular planar undersurface 22.

Lower core pin 14 is a elongate cylindrical tube having a central bore 24 constructed to receive cylindrical shaft 18 of upper core pin 12. The upper end of lower core pin 14 defines an annular planar upper surface 26 which as shown in FIG. 1, faces planar undersurface 22 of upper core pin 12.

Annular O-ring 16, which may be formed of high temperature silicone rubber or another temperature-resistant elastomer, is positioned about cylindrical shaft 18 between planar undersurface 22 of upper core pin 12 and planar upper surface 26 of lower core pin 14.

Core pin assembly 10 is designed to permit relative movement between upper core pin 12 and lower core pin 14 and to permit resilient deformable compression of annular O-ring 16 between planar undersurface 22 and facing upper surface 26.

Figure 2:
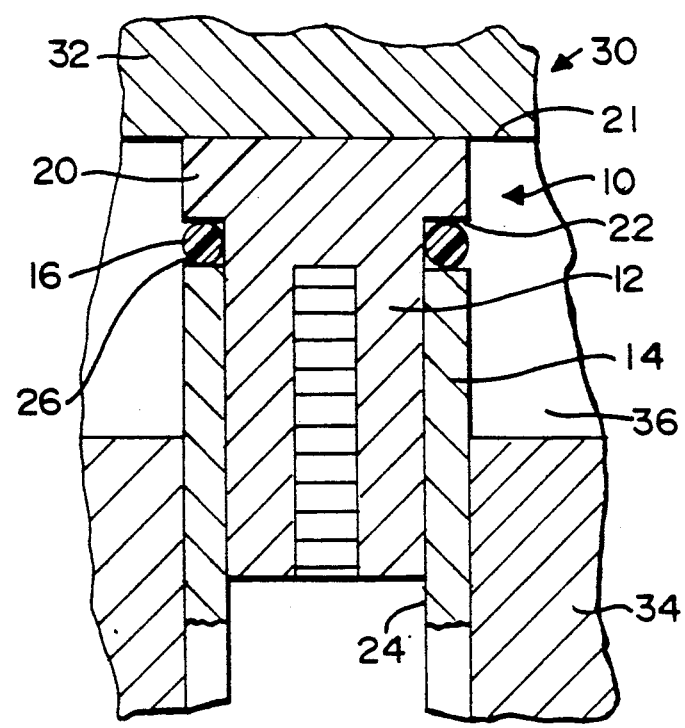
FIG. 2 shows, in section, the core pin assembly of FIG. 1 inserted between opposed open mold halves.
Figure 3:
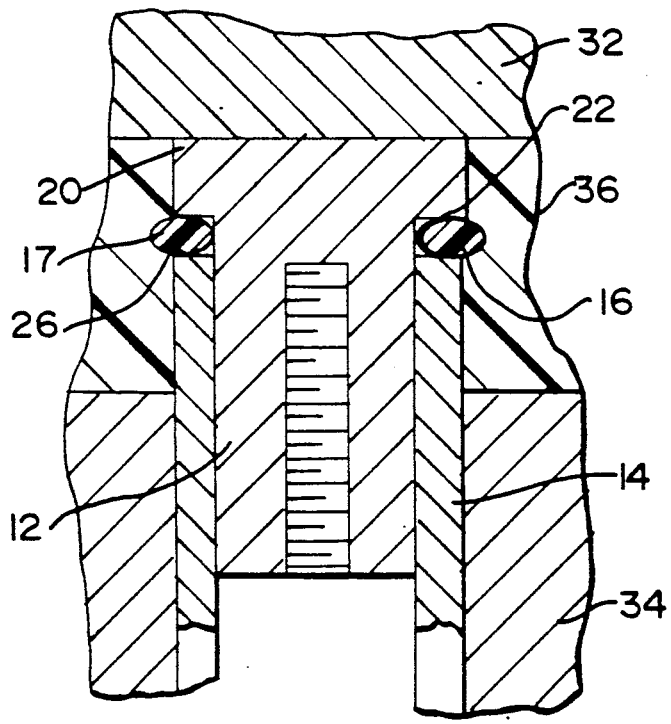
FIG. 3 shows, in section, the core pin assembly and mold halves of FIG. 2 in closed condition with plastic molded therearound.

Referring to FIG. 2, a die apparatus 30, including core pin assembly 10, is shown. Die apparatus 30 includes an upper mold half of 32 and a lower mold half 34 constructed to be movable with respect to one another. Die halves 32 and 34 are movable toward and away from each other between closed and open positions, as is well known in the injection molding art, to permit a molded part to be formed in the die cavity 36 formed therebetween. As is conventional in the injection molding of a plastic part, mold halves 32 and 34 are brought together to a closed position and held in that position under pressure while heated liquified plastic is injected therebetween (FIG. 3). Once formed and cooled, the molds are away from each other to an open position where the molded part may be removed.

Core pin assemblies are moved into position upon closure of the mold halves and are retracted upon opening of the mold halves to facilitate removal of the molded part. Thus, it is necessary that the core pin assembly be easily retractable through the bore formed thereby in the molded part without damage thereto. Where a simple cylindrical bore is formed, the core pin assembly 10 may be easily removed through the bore just formed. However, where an undercut or groove is desired to be placed around the formed bore, it may be more difficult to remove the core pin assembly without damaging the newly molded part.

Core pin assembly 10 permits the molding of a groove about a bore formed thereby and yet allows for the easy removal of the core pin assembly from the newly molded part.

Lower core pin 14 is supported by lower die/half 34. Annular O-ring 16 sits atop planar upper surface 26 of lower core pin 14. Cylindrical shaft 18 of upper core pin 12 is positioned within central bore 24 of lower core pin 14 so that planar undersurface 22 of disc-shaped plate 20 sits against O-ring 16. The size and shape of O-ring 16 is selected so that its outer diameter is substantially coextensive with the outer diameter of lower core pin 14 and the outer radial extent of disc-shaped plate 20. Thus, as shown in FIG. 2, core pin assembly 20 may be easily inserted and retracted from between the mold halves 32 and 34 without damaging a molded part formed therearound. During formation of the molded part, the mold halves 32 and 34 are brought together approaching a closed position. Prior to closure, upper die half 32 bears against a top surface 21 of disc-shaped plate 20.

Referring now to FIG. 3, continued relative movement of upper and lower die halves 32 and 34 toward each other causes relative movement between upper core pin 12 and lower core pin 14. Planar undersurface 22 of upper core pin 12 is brought into close proximity with planar upper surface 26 of lower core pin 14. The resilient annular O-ring 16 is compressed between the facing surfaces. As the O-ring 16 is constrained on three sides as shown in FIG. 3, the O-ring 16 will expand radially outwardly into the mold cavity 36. The O-ring 36 flattens vertically and expands horizontally to roughly an elliptical shape. The radial expansion of O-ring 16 provides an annular protruding extent 17 which extends beyond the outer diameter of lower core pin 14 and the outer radial extent of the disc-shaped plate 20. Protruding extent 17 of annular ring 16 is used to form an annular groove within the molded part.

Shown in closed condition in FIG. 3, heated liquified plastic 40 is injected between closed mole halves 32 and 34. The outer cylindrical surface formed by upper core pin 12 and lower core pin 14 forms a cylindrical bore within the part to be molded. Protruding extent 17 of annular O-ring 16 forms and annular groove about the bore formed in the molded part. As plastic must be heated to extremely high temperatures to permit flow between the mold halves 32 and 34, O-ring 16 must be resistant to such high temperatures.

Once the plastic has cooled and set, the mold halves 32 and 34 are opened. As mold half 32 moves away from mold half 34, the resiliency of O-ring 16 and the tendency of it to return to its original state will in turn move upper core pin 12 upwardly away from lower core pin 14. The core pin assembly 10 including annular O-ring 16 will return to its original state shown in FIG. 2. In an uncompressed state, annular O-ring 16 no longer projects beyond the outer diameter of lower core pin 14 or the outer peripheral extent of disc-shaped plate 20. Core pin assembly 10 may then be easily removed or retracted without damaging the newly molded part.

Figure 4:
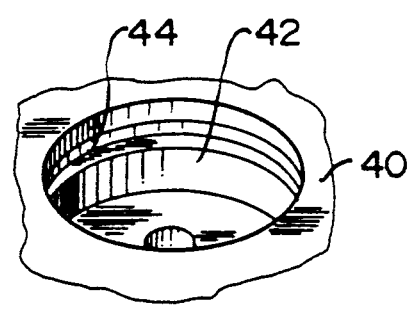
FIG. 4 is a partial fragmentary showing of a molded part having an internal groove formed in accordance with the present invention.

An example of a molded part which may be formed in accordance with the present invention is shown in FIG. 4. Molded part 40 includes a central cylindrical bore 42 formed by core pin assembly 10. Molded part 40 further includes an annular groove 44 about cylindrical bore 42, which is formed by protruding extent 17 of the compressed annular O-ring 16.

It, of course, may be seen that the particular shape of the groove 44 placed in the molded part 40 need not be annular. Any other shape may be selected by the selection of an appropriate shape of an elastomeric member for positioning between movable core pin members.

Various changes to the foregoing described and shown structures would now be evident to those skilled in the art. Accordingly, the particularly disclosed scope of the invention is set forth in the following claims.

We claim:

1. A die apparatus for permitting formation of an internal recess in a molded part, said die apparatus comprising:
   a first mold member;
   a second mold member, said first and second mold members being relatively movable between an open and closed position, said mold members forming a mold cavity when in said closed position, wherein said molded part is formed in said mold cavity;
   a first core pin element;

a second core pin element, said first and second core pin elements being supported respectively by said first and second mold member for relative movement therwith;

a resiliently deformable element positioned between said first and second core pin elements, said resiliently deformable element being deformably expandable to form an external projection extending into said mold cavity upon said movement of said first and second mold members to said closed position and elastically returnable upon said relative movement of said first and second mold members to said open position.

2. A die apparatus of claim 1 wherein said resiliently deformable element is an annular element which is radially outwardly expandable.

3. A die apparatus of claim 2 wherein said annular element is compressible to effect said radially expansion.

4. A die apparatus of claim 2 wherein said annular element is formed from a high-temperature-resistant elastomer.

5. A die apparatus for forming an internal recess in a molded part, said die apparatus comprising:
   a stationary mold member;
   a movable mold member, movable toward and away from said stationary mold member, said member forming a mold cavity when said movable mold member is moved towards said stationary member, wherein said molded part is formed in said mold cavity;
   a first core pin member supported by said stationary mold member, said first core pin member including a first planar surface having an outer peripheral boundary;
   a second core pin member engagable with said movable mold member for movement with respect to said first core pin member, said second core pin member having a second planar surface defined by an outer peripheral boundary, said first and second planar surfaces being axially aligned and movable toward and away from each other with said respective outer peripheral boundaries extending substantially co-extensively; and
   a resiliently deformable element positioned between said first and second planar surfaces, said element having a first state including an outer peripheral boundary substantially co-extensive with said boundaries of said first and second planar surfaces, said deformable element being deformably expandable between said first and second planar surfaces to expand from said first state to a second state where said peripheral boundary of said element extends outwardly beyond said boundaries of said first and second planar surfaces and into said mold cavity upon movement of said movable mold member toward said stationary mold member, said element being resiliently returnable to said first state upon said movement of said movable mold member away from said stationary mold member.

6. A die apparatus of claim 5 wherein said resiliently deformable element includes a longitudinal extent and a transverse extent.

7. A die apparatus of claim 5 wherein said deformable element is transversely compressible between said first and second planar surfaces and longitudinally expandable upon said transverse compression.

8. A die apparatus of claim 5 wherein said resiliently deformable element is formed from a high-temperature-resistent elastomer.

9. A die apparatus for forming an internal annular groove in a molded part, said die apparatus comprising:
   a first mold member;
   a second mold member relatively movable with respect to the first mold member between an open and a closed position, said mold members forming a mold cavity when in said closed position, wherein said molded part is formed in said mold cavity;
   a first core pin element supported by said first mold member, said first core pin element having an elongated tubular body with a longitudinal internal bore and an annular first end surface having an inner and outer periphery;
   a second core pin element engagable with said second mold member for relative movement therewith, said second core pin element having an elongated shaft movably supported in said tubular bore of said first core pin element body and a disc-shaped end defining an annular second end surface having an outer periphery co-extensive with the outer periphery of said first end surface, said first and second end surfaces being relative movable towards and away from each other in response to said relative movement of said first and second mold members; and
   a resiliently deformable annular ring supported between said first and second end surfaces, said ring having an inner and outer periphery substantially co-extensive with said inner and outer periphery of said first end surface, said ring being compressible between said first and second end surfaces upon said relative movement of said first and second mold members to a closed position, to a condition where said outer periphery of said ring extends outwardly beyond said outer periphery of said first end surface and into said mold cavity.

10. A die apparatus of claim 9 wherein upon movement of said first and second mold members from a closed position to an open position said ring is resiliently returnable to a condition where said outer periphery is co-extensive with said first end surface.

11. A die apparatus of claim 10 wherein said annular ring has a circular cross-section.

12. A die apparatus of claim 11 wherein said annular ring has an elliptical cross-section in said compressed condition.

13. A die apparatus of claim 9 wherein said annular ring is formed from a high-temperature-resistent elastomer.

14. A die apparatus of claim 9 wherein said annular ring is made of silicone rubber.

* * * * *